United States Patent
Yoakim et al.

(10) Patent No.: US 8,734,881 B2
(45) Date of Patent: May 27, 2014

(54) CAPSULE WITH FILTERING INSERT FOR PREPARING A COFFEE BEVERAGE

(75) Inventors: Alfred Yoakim, St. Legier la Chiesaz (CH); Alexandre Perentes, Lausanne (CH); Arnaud Gerbaulet, Oye et Pallet (FR)

(73) Assignee: Nestec S.A., Vevey (CH)

( * ) Notice: Subject to any disclaimer, the term of this patent is extended or adjusted under 35 U.S.C. 154(b) by 458 days.

(21) Appl. No.: 12/727,790

(22) Filed: Mar. 19, 2010

(65) Prior Publication Data

US 2010/0239733 A1    Sep. 23, 2010

(30) Foreign Application Priority Data

Mar. 19, 2009  (EP) .................................... 09155575
Jun. 22, 2009  (EP) .................................... 09163341

(51) Int. Cl.
*A23F 5/24*   (2006.01)
*A47J 31/44*  (2006.01)
*B65D 85/804* (2006.01)
*A47J 31/36*  (2006.01)

(52) U.S. Cl.
CPC ......... *B65D 85/8043* (2013.01); *A47J 31/3623* (2013.01)
USPC ............. 426/431; 426/78; 426/115; 426/432; 99/295; 99/302 R (58) Field of Classification Search
USPC ......... 426/77, 78, 431, 79, 80, 81, 82, 83, 84, 426/115, 432, 433, 434; 99/295, 302 R
See application file for complete search history.

(56) References Cited

U.S. PATENT DOCUMENTS

| | | | |
|---|---|---|---|
| 2,157,596 A * | 5/1939 | Davis | 419/2 |
| 3,292,527 A | 12/1966 | Strasse | 99/295 |
| 3,672,909 A * | 6/1972 | Berry et al. | 426/443 |
| 4,053,371 A | 10/1977 | Towsley | 204/20 |
| 4,846,052 A | 7/1989 | Favre et al. | 99/295 |
| 4,853,234 A | 8/1989 | Bentley et al. | 426/77 |

(Continued)

FOREIGN PATENT DOCUMENTS

| | | | |
|---|---|---|---|
| BE | 1 006 165 A5 | | 5/1994 |
| CN | 1520372 A | | 8/2004 |

(Continued)

OTHER PUBLICATIONS

European Search Report, EP 09155575, mailed Oct. 7, 2009.

(Continued)

*Primary Examiner* — Chhaya Sayala
*Assistant Examiner* — Walter Moore
(74) *Attorney, Agent, or Firm* — Winston & Strawn LLP (57) ABSTRACT

A capsule for the production of a beverage from a beverage production machine that provides a capsule holder with relief and recessed elements. The capsule includes an inverted cup-shaped body forming a chamber containing a beverage forming ingredient, a bottom injection wall, a sidewall and a flange-like rim; and a delivery wall which is sealed to the body and comprises a relatively flat outer surface extending from the central axis of the capsule to the flange-like rim of the body and at least one portion of porous material capable of providing a backpressure that is greater than the backpressure of the beverage forming ingredient in the chamber. Also, a system and method for the production of a beverage from the previously described capsule.

19 Claims, 9 Drawing Sheets

(56) References Cited

U.S. PATENT DOCUMENTS

| | | | |
|---|---|---|---|
| 4,886,674 A | 12/1989 | Seward et al. | 426/79 |
| 5,008,013 A * | 4/1991 | Favre et al. | 210/482 |
| 5,242,702 A | 9/1993 | Fond | 426/433 |
| 5,402,707 A | 4/1995 | Fond et al. | 99/295 |
| 5,472,719 A | 12/1995 | Favre | 426/77 |
| 5,566,605 A * | 10/1996 | Lebrun et al. | 99/302 C |
| 6,832,542 B2 | 12/2004 | Hu et al. | 99/302 R |
| 7,393,446 B2 | 7/2008 | Towsley | 205/109 |
| 2002/0078831 A1 | 6/2002 | Cai | 99/295 |
| 2003/0056661 A1 | 3/2003 | Hu et al. | 99/495 |
| 2003/0091803 A1 * | 5/2003 | Bond et al. | 428/292.1 |
| 2003/0096038 A1 | 5/2003 | Cai | 426/77 |
| 2003/0222089 A1 * | 12/2003 | Hale | 220/912 |
| 2004/0115310 A1 | 6/2004 | Yoakim et al. | 426/77 |
| 2004/0115317 A1 | 6/2004 | Doglioni | 426/123 |
| 2005/0150390 A1 | 7/2005 | Schifferle | 99/295 |
| 2005/0266122 A1 * | 12/2005 | Franceschi | 426/77 |
| 2006/0110507 A1 | 5/2006 | Yoakim et al. | 426/433 |
| 2007/0148290 A1 * | 6/2007 | Ternite et al. | 426/90 |
| 2007/0186784 A1 | 8/2007 | Liverani et al. | 99/295 |
| 2007/0224319 A1 | 9/2007 | Yoakim et al. | 426/433 |
| 2007/0261564 A1 | 11/2007 | Liverani et al. | 99/279 |
| 2009/0280219 A1 | 11/2009 | Yoakim et al. | 426/77 |
| 2010/0288133 A1 * | 11/2010 | Litzka et al. | 99/299 |

FOREIGN PATENT DOCUMENTS

| | | |
|---|---|---|
| EP | 0 179 641 B1 | 4/1986 |
| EP | 0 242 556 A1 | 10/1987 |
| EP | 0 468 078 A1 | 1/1992 |
| EP | 0 468 079 B1 | 1/1992 |
| EP | 0 512 468 B1 | 11/1992 |
| EP | 0 512 470 B1 | 11/1992 |
| EP | 0 554 469 B1 | 8/1993 |
| EP | 1 165 398 B1 | 1/2002 |
| EP | 1 273 528 B1 | 1/2003 |
| EP | 1 579 792 B1 | 9/2005 |
| EP | 1 654 966 A1 | 5/2006 |
| EP | 1 700 548 B1 | 9/2006 |
| EP | 1 702 543 B1 | 9/2006 |
| EP | 1775234 A1 * | 4/2007 |
| EP | 1 929 904 A1 | 6/2008 |
| WO | WO 02/058522 A2 | 8/2002 |
| WO | WO 02/081337 A1 | 10/2002 |
| WO | WO 03/073896 A1 | 9/2003 |
| WO | WO 2005/092160 A1 | 10/2005 |
| WO | WO 2006045536 A1 * | 5/2006 |
| WO | WO 2008012202 A1 * | 1/2008 |
| WO | WO 2008028212 A1 * | 3/2008 |

OTHER PUBLICATIONS

Search Report, European Application No. 09155571, Oct. 9, 2009.
Search Report, European Application No. 10156614, Jun. 24, 2010.
Federal Register, Feb. 9, 2011, pp. 7162-7175.

* cited by examiner

FIG. 18

CAPSULE WITH FILTERING INSERT FOR PREPARING A COFFEE BEVERAGE

BACKGROUND

The present invention relates to a capsule for preparing coffee in a beverage production machine. It also relates to a coffee capsule system including such capsule.

Single-serve beverage capsules are very popular because they provide a fresh tasting beverage quickly, conveniently and in a clean fashion. Therefore, certain beverage capsule systems propose to extract a coffee liquid from roast and ground coffee ingredients contained in a capsule that opens under pressure when a sufficient amount of water fills the capsule. More particularly, the pressure of liquid increases in the capsule before the delivery face of the capsule opens thereby conferring a good quality of extraction.

In particular, the NESPRESSO® capsule system, as described in EP0512470B1, is based on the principle that an extraction face of the capsule is torn against relief and recessed elements of a capsule holder in the beverage production machine. The extraction face tears at the location of these relief elements and/or recessed elements on reaching the breaking stress to enable the liquid, e.g., coffee extract, to be removed after extraction of the coffee under a certain positive pressure. EP0512468B1 also describes a capsule which is adapted for such extraction process and device.

Although such process produces an outstanding coffee quality due to this retarded opening of the extraction face of the capsule, the opening of the face may be difficult to repeatedly control as it depends on many different factors. Therefore, the extraction face is generally formed of a membrane having a very precisely controlled thickness of aluminum, in particular, of about 30 microns. Despite all care taken for designing such capsule, the opening of the membrane may be more or less retarded and the consistency of the flow may also be affected in some way depending on the characteristics of the ground coffee, the sizes of the perforations through the membrane, etc.

Many patents describe capsules which do not fit into a beverage production device comprising a capsule holder comprising relief and recessed elements as described in EP0512470B1.

EP1273528B1 relates to a closed supple capsule designed to be extracted under pressure comprising a first foil that allows water to pass at atmospheric pressure by piercing with a piercing means and a second foil that is such that it only allows water to pass when an excess pressure between 0.1 and 3 bar is attained during extraction; the foil being made of filter paper or of non-woven with a sufficiently close meshwork. However, such capsule is configured for insertion in a coffee machine comprising a large opening at the delivery side of the capsule such as described in EP0242556. The delivery foil of such capsule would perforate at the beginning of extraction against a capsule holder of a coffee machine as described in EP0512470B1.

U.S. Pat. No. 3,292,527 relates to an apparatus and cartridge wherein the cartridge comprises a truncated cup sealed by an upper foil, the bottom of the cup being a disc formed of small perforations in the fashion of a sieve. This disc is intended more particularly for infusions, lixivations and decoctions (coffee, tea, lime-blossom, etc.). The apparatus has a capsule holder with a large hole such that a direct flow can be provided from the capsule with reduced contact with the machine.

WO02/058522A2 relates to a cartridge and method for making fluid comestibles comprising a bulb-like or cup-like body which comprises one or more compartment for beverage ingredients, a filter and possibly a wall formed of a small orifice to provide a restriction to the beverage flow enabling the production of foam or coffee cream. However, the capsule is not designed for matching a capsule holder comprising relief and recessed elements.

EP1579792B1 relates to an integrated cartridge for extracting a beverage from a particulate substance comprising an internal volume comprising valve means, in particular, a pad or disc of a resilient material which comprises at least one through slit or orifice that is normally closed for insulating the internal volume of the cartridge and for retaining liquid residuals inside the internal volume when the beverage extraction has been terminated. However, such cartridge is relatively complicated in its conception and cannot by associated to a capsule holder comprising relief and recessed elements.

Accordingly, there is a need for improved products of these types and this need is now met by the products and methods of the present invention.

SUMMARY OF THE INVENTION

The invention generally relates to a capsule for the production of a beverage from a beverage production machine that provides a capsule holder with relief and recessed elements. The capsule comprises an inverted cup-shaped body forming a chamber containing a beverage forming ingredient, a bottom injection wall, a sidewall and a flange-like rim; and a delivery wall which is sealed to the body and comprises a relatively flat outer surface extending from the central axis of the capsule to the flange-like rim of the body and at least one portion of porous material capable of providing a backpressure that is greater than the backpressure of the beverage forming ingredient in the chamber.

Advantageously, the portion of porous material provides a back-pressure of at least 2 to 3 bars and the delivery wall forms an insert comprising a three-dimensional portion of porous material, with the portion of porous material of the insert having a ratio of transversal width to depth varying from 30:1 to 1:30. The portion of porous material typically extends across the entire width of the chamber and preferably has a thickness that varies in the transversal direction of the capsule. Also, the insert may be made of at least one portion of porous material and at least one portion of impermeable material, wherein the portion of porous material is placed at the periphery of the portion of impermeable material when taken in the transversal direction of the insert and the portion of porous material is placed in the center of the insert.

The invention also relates to a system for the preparation of a beverage comprising a beverage production machine comprising a capsule holder with relief and recessed elements and a water injection cage with a pressing edge, and one of the capsules disclosed herein, such that injection of water into the capsule forms the beverage.

Preferably, the pressing edge of the injection cage is formed of radially oriented slots which are filled by sealing means of the capsule to provide a sufficient tightness enabling the pressure to rise in the capsule as a result of the backpressure created by the bed of ingredients and porous portion. The slots typically have a depth between 0.2 and 0.8 mm and the pressure rises at least 5 to 8 bars at the injection outlet of the injection cage.

The invention also relates to a method of forming a beverage by providing a capsule as disclosed herein; injecting water into the capsule for combining with the beverage forming ingredients therein to form the beverage; and withdrawing the beverage from the capsule for consumption.

A preferred beverage forming ingredient is coffee, such that the present invention specifically aims at providing a capsule solution for fitting a coffee production machine comprising a capsule holder with relief and recessed elements normally used for tearing an extraction face of a capsule, with the capsule working on a different principle which, in particular, provides an appropriate build-up of pressure generating an intimate interaction between the coffee grains and water, as well as a consistent flow of the coffee delivered through the capsule. This also assists in forming a desirable cream on the surface of the coffee beverage.

BRIEF DESCRIPTION OF THE DRAWINGS

Further characteristics and advantages of the present invention will become apparent in the description of the figures that follows.

DETAILED DESCRIPTION OF THE INVENTION

The invention preferably relates to a capsule for the production of coffee, in a beverage production machine comprising a capsule holder with relief and recessed elements. The capsule comprises an inverted cup-shaped body forming a chamber containing ground coffee, a bottom injection wall, a sidewall and a flange-like rim; and a delivery wall which is sealed to the body and comprising a relatively flat outer surface extending from the central axis of the capsule to the flange-like rim of the body. The capsule is also characterized in that the delivery wall comprises at least one portion of porous material capable of providing a backpressure that is greater than the backpressure of the ground coffee in the chamber.

The terms "relatively flat outer surface" means that the outer surface of the delivery wall is either totally flat, which is preferred, or is slightly convex or concave provided that the maximal inward or outward deflected distance measured relatively to a flat transversal plane normal to the central axis, is below about 1.5 mm.

The invention is specifically exemplified by and is preferred for the production of coffee, but it is within the scope of this invention to use other beverage forming ingredients such as tea, chocolate, or other beverage producing ingredients that are provided in ground or powdered form and which form the beverage after contact with water that is preferably heated to extract the beverage ingredients from the capsule and form the beverage.

The invention is based on the principle of replacing the tear membrane of the prior art capsule by a membrane comprising a porous portion, such as a filtering insert of relatively flat, pressure and heat resistant configuration, i.e., for compatibility onto the normally perforating capsule holder; such insert being capable of providing a delayed release of the coffee beverage by its own characteristic of backpressure offered against the coffee beverage thereby enabling high interaction between the coffee particles and hot water in the capsule. The porous portion further enables to provide a high amount of coffee cream on top of the coffee beverage essentially due to the pressure release through the insert and the fine filtering lattice formed by the porous material that creates relatively high shear and elongational forces.

The delivery wall provides a back-pressure of at least 2 bar, preferably at least 3 bar. Even more preferably, the backpressure is of at least 5 bar, most preferably at least 6 bar.

In a mode, the delivery wall comprises an insert comprising a three-dimensional portion of porous material. The insert is more particularly configured to resist to any perforation against the relief and recessed elements of the capsule holder during extraction. More particularly, the portion of porous material of said insert has a ratio of transversal width to depth varying of from 100:1 to 1:30. The "width" is defined here as being the minimal transversal dimension of the porous portion at which the coffee beverage must be passed through to exit the capsule and which is substantially perpendicular to the central axis of the capsule. The "depth" is here defined as the maximal longitudinal or axial dimension of the porous portion which is substantially aligned with the direction of the central axis of the capsule. The given ratio of the porous portion enables to offer a relatively long filtering flowpath to the coffee beverage while also achieving a certain rigidity to the insert so that it does not tear against the relief and recessed elements of the capsule holder. More preferably, the portion of porous material of said insert has a ratio of transversal width to depth varying of from 30:1 to 1:20.

The minimal thickness of the insert is comprised between 0.2 and 5 mm, preferably between 0.4 and 3 mm, most preferably between 0.6 and 1.5 mm. A certain thickness of the insert is necessary to reduce deformation, due the building of the inside pressure, of the delivery wall against the capsule holder. If the deformation is too high, the wall can tear against the relief elements of the capsule holder and/or the orifices provided in the capsule holder can be partially or entirely blocked and the flow of coffee hindered. Therefore, it is preferred to minimize the deformation of the delivery wall, i.e., insert.

In a first mode, the portion of porous material extends across the entire width of the chamber. Also, the cross section of the porous portion can vary along the axial direction. For instance, the porous portion may have a cross section that increases in direction of the central axis of the capsule or on the contrary that decreases in direction of the central axis of the capsule. The porous portion can form a restrictive cross section, i.e., a zone of reduced cross section in transverse direction. This zone or reduced cross section may be, for instance of about 0.5 to 10 mm. Therefore, the portion of porous material may have a zone of large cross section followed by a zone of reduced cross section wherein the ratio of the zone of large cross section to the zone of reduced cross section is comprised between 500:1 and 5:1.

In a first embodiment, the insert is formed exclusively of porous material. The insert can be formed as a rigid disk of porous material. The porous disk is thus inserted in the cup-shaped body and preferably sealed to the interior surface of the body. The porous disk has preferably a diameter that matches the inner diameter of the body. Insertion can be made by press-fitting and eventually welding (e.g., by heat or ultrasonically). A sealing layer such as a thermofusible material can be inserted between the disk and the body to ensure the proper connection between the insert and the body of the capsule or the disk itself is made of a thermofusible material.

In other embodiments of the present invention, the insert comprises at least one portion of porous material and at least one portion of impermeable material. By "impermeable" material, we refer here to the impermeability to liquids, and in particular, to coffee liquid. Therefore, the insert may comprise permeable and impermeable portions for channeling the flow of the coffee liquid through the permeable portion of the insert. It is thus possible to ensure a gradient of pressure in the coffee bed which varies in the transversal direction of the coffee bed. It is also possible to favor coffee flow through the porous portion at different depths in the chamber of the capsule.

In particular, the portion of porous material can be placed at the periphery of the portion of the impermeable material when taken in the transversal direction of the insert. Consequently, the coffee liquid is forced to exit the capsule along the inner side of the capsule. This may be an advantage, when water is injected close to the central axis of the capsule, to have the liquid traverse the coffee both in axial and transversal direction in the coffee bed.

In another configuration, the portion of porous material is placed in the centre of the insert and the portion of impermeable material is placed at the periphery of the portion of porous material as taken along the transversal direction of the capsule.

Of course, an annular portion of impermeable material may also separate a first central portion of porous material and a second annular portion of porous material to force the flow of coffee liquid both through the centre and close to the inner side of the capsule.

In certain embodiments, the portion of porous material protrudes inwardly in the chamber from the portion of impermeable material. Thus, the filtering of coffee can be promoted in a transversal direction as well as in an axial direction. It means that a certain amount of liquid traversing the coffee particles can exit through the filtering portion without traversing the whole coffee bed in the axial direction. Such configuration may be advantageous for preventing the whole amount of injected water passing through the entire coffee bed. As a result, less bitterness can be obtained for certain coffee such as for large coffee volumes, e.g., lungo coffee.

According to an aspect of the invention, the portion of porous material can be formed as an open cell structure of aggregated solid particles which holds a large number of pores both in the axial and transversal directions. For instance, the median pore diameter is of from 5 and 60 microns and the porosity between 20 and 70% (As measured by mercury porosimeter). For instance, the portion is a block of sintered material. Sintered elements provide the ability to form three-dimensional porous inserts with a certain rigidity and high strength under pressure of extraction. The insert can deform less than other types of filters. The insert can also be formed at large industrial scale and at relatively low cost. The process of sintering may be applied with or without pressure.

The portion of porous material may also be obtained by other techniques such as layering of several layers of porous material until a three-dimensional filtering structure of sufficient thickness for rigidity is obtained. A three-dimensional filtering structure is thus configured by a filtering lattice in both the transversal and axial dimensions of the insert. For instance, a plurality of layers of plastic non woven and metal lattice can be stacked wherein the metal (e.g., aluminum) provides the rigidity to the insert. The layering of a filtering multilayer of porous materials can be obtained by heat lamination, co-extrusion and/or hot pressing.

The portion of porous material may also comprise at least one layer of sintered material and at least one layer of non woven or metal lattice which are stacked and bound together.

The portion of porous material may also be obtained by electrodepositing a metal in the interstitial spaces of a polymer foam followed by dissolution of the foam to form the porous metal structure such as described in U.S. Pat. Nos. 4,053,371 or 7,393,446.

Another possible form of the porous material is a foam with a three-dimensional open cellular structure. The micro-cells which are formed into the structure of the foam enable to provide a filtering effect for the coffee liquid. The foam may be formed of sufficiently rigid, heat resistant polymer material, high strength and possibly slightly deformable under the pressure of extraction.

The portion of porous material may also be a two-dimensional element comprising only axially oriented openings provided through its wall.

Preferably, the portion of porous material is formed of ceramic, metal, carbon or polymers such as PTFE, polyamide, polypropylene, polyethylene, polyurethane and combinations thereof. The porous portion may also be a composite portion of metal and ceramic (CMC, IMC) for instance. The porous material may further comprise fibers such as carbon, glass, ceramic, etc.

In another possible mode, the portion of porous material is formed of biodegradable materials selected from the group comprising: polylactic acid (e.g., CPLA), biobase polypropylene, ricin-oil based polyamide, starch-based polymers, PVOH and combinations thereof.

It should be noted that for reasons of recyclibility, the delivery wall and body are constituted of substantially common material(s).

The portion of porous material may also be formed of fabric and/or non woven.

In particular, the portion of porous material is or comprises a fabric selected the group comprising fluoropolymer (PTFE, e.g., GORETEX®), polyurethane, polyester, polyamide and combinations thereof.

The delivery wall may comprise an additional breakable or peelable membrane for closing the portion of porous material.

If breakable, the membrane should be broken easily by the mechanical pressure on the relief and recesses of the capsule holder such as during closure of the beverage producing device on the capsule. For instance, the breakable seal can be an aluminum membrane of less than 10 microns which is laminated or welded onto the porous portion of the delivery wall.

The capsule of the invention also preferably comprises a dedicated sealing means for providing a liquid-tight engagement with the injection cage of the beverage producing device. The sealing means thus ensures that the pressure of fluid can properly increase in the capsule by the back-pressure formed by the delivery wall and no substantial leakage of liquid between the capsule and the pressing surface of the injection cage is present. In particular, the sealing means is provided at the flange-like rim of the capsule.

In a mode, the sealing means is a compressible thickness of material to provide a liquid tightness with the pressing surface of the injection cage of the device under the pressure of extraction liquid.

In an alternative mode, the sealing member is a foldable part of the flange-like rim. The foldable part can be a thin plastic curled lip or an annular step. The annular part can be formed as an increase of the diameter of the body at the intersection between the sidewall and the flange-like rim of the body. Hence, the foldable part is pressed by the pressing surface of the injection cage of the device when the cage is closed onto the capsule holder in order to compensate for the clearance existing between the pressing surface and the body of the capsule. As a result, the liquid is forced to pass through the substance in the capsule and through the porous portion of the delivery wall.

The sealing means can be made integral with the body. In other words, the sealing means is formed together with the material of the body, e.g., as plastic (e.g., PP, biodegradable polymer, . . . ) material.

The sealing means is preferably present at the intersection line between the flange-like rim and the sidewall of the body, either by an additional part (e.g., a rubber sealing member) or an integral part (e.g., a sufficient plastic thickness).

The sealing means can form a local increase of thickness at the intersection between the flange-like rim and the base of the sidewall. The local increase of thickness can form a substantially L-shaped section of material at the intersection of the sidewall and flange-like rim. For an optimal sealing effect, the local increase can comprise a concave surface with a maximal thickness at the intersection line between the sidewall and the rim and a thickness that progressively reduces from the intersection line to the ends. The thickness of the body including the sealing means at the intersection may represent at least 20%, most preferably, at least 30% increase of the mean thickness of the body.

The sealing means can be added onto the outer surface of the body. In particular, the sealing member can be added at the intersection between the sidewall and the flange-like rim while extending partly or totally along the surface of the rim.

The sealing means can be made of compressible plastic or rubber (e.g., silicone).

Preferably, the material for the sealing means, whether added or integral with the capsule, is relatively soft to ensure a proper filling of the clearance, e.g., air inlets, during closure of the machine and also to avoid important and repeated mechanical constraints on the closure mechanism (e.g., knee joint lever or cam system) of the beverage production machine. For this, the material for the sealing means is preferably lower than 70 shore A, most preferably equal to or lower than 60 shore A.

In another possible embodiment, the portion of porous material of the insert can also comprise or be formed of compacted particles such as compacted particles of coffee. Therefore, the coffee liquid is actually filtered by the compacted layer of coffee itself. In this case, a filtering wall is placed downstream of the compacted layer of coffee to ensure that the coffee particles that break up from the insert are also retained in the capsule. The filtering wall can be a simple porous membrane or a thin layer made of paper, plastic and/or aluminum. The filtering wall can be sealed on the flange-like rim of the body of the capsule. Compacted coffee is obtained by pressing a layer of coffee particles until a solid, self-supporting layer of coffee is obtained. The compaction of coffee can be obtained under rolls or by means of a press. The pressure, temperature and humidity are factors which are determined by the person skilled in the art to obtain a sufficiently compacted solid layer of coffee. The layer of compacted coffee can be comprised between 0.5 and about 10 mm. Its width preferably extends along the whole cross section of the chamber of the capsule. It is however possible to provide an insert for closing the chamber and formed of an impermeable portion and a portion of compacted coffee. The impermeable cross section can be, for instance, a metal or plastic element comprising a recess for receiving the portion, e.g., plug, of compacted coffee. It is also possible to have the insert produced as a combination of a portion of porous plastic, metal and/or ceramic material and a portion of compacted coffee. In this case, both portions are permeable to the coffee liquid. The two portions may be placed side by side or in series across the flowpath of the coffee liquid.

The capsule of the present invention preferably contains roast and ground coffee having an average particle size ($D_{4,3}$) comprised between 250 and 600 microns. The capsule can be filled with a dose of coffee comprised between about 4.5 and 7 grams. The chamber of coffee has preferably a height comprised between 25 and 30 mm and a larger width comprised between 25 and 32 mm.

It should be noted that the capsule can be a refillable capsule. In particular, the capsule may comprise a detachable and re-closable delivery wall, e.g., a porous insert. The delivery wall may be partially or fully detachable relative to the flange-like rim of the body. By partially detachable, it is meant that the delivery wall can be separated partially from the flange-like rim to open the capsule for refilling with substance (e.g. coffee powder) but remains attached by a short link to the body such as by a bendable plastic portion. In particular, the delivery wall forms an insert which is press-fittable through the main opening of the body. A complementary clipping configuration of the insert and body may be formed to secure the closure and hence prevents the capsule from opening accidentally when inserted or removed from the machine.

The present invention can also relates to the combination of a capsule as aforementioned and a beverage production machine, i.e., a system for the preparation of a beverage, comprising a capsule holder wherein said capsule holder has relief elements and recessed elements for holding the beverage delivery wall of the capsule. As aforementioned, the capsule of the invention comprises an insert which is arranged to resist perforation during the extraction pressure conditions against the relief and recessed elements of the capsule holder and which is able to provide a certain backpressure against the coffee liquid traversing it, preferably of least 2 bar, most preferably at least 3 bar.

More particularly, the system of the invention comprises an injection cage for injecting liquid in the capsule with a pressing edge or surface designed for pressing onto the surface of the capsule, more particularly, at the flange-like rim. The pressing edge of the injection cage is formed of radially oriented slots which are filled by the sealing means of the capsule to provide a sufficient tightness enabling the pressure to rise in the capsule as a result of the back-pressure created by the coffee and porous portion and, consequently, cream to form on the top of the beverage.

The radially oriented slots allow air to enter between the capsule cage and the capsule when the pressing force of the injection cage is released thus allowing the capsule to be removed more easily from the cage.

Although the capsule has been described to preferably fit in a coffee production machine as described in EP0512470B1, the capsule of the invention may also be utilized in other machines.

Figure 1:
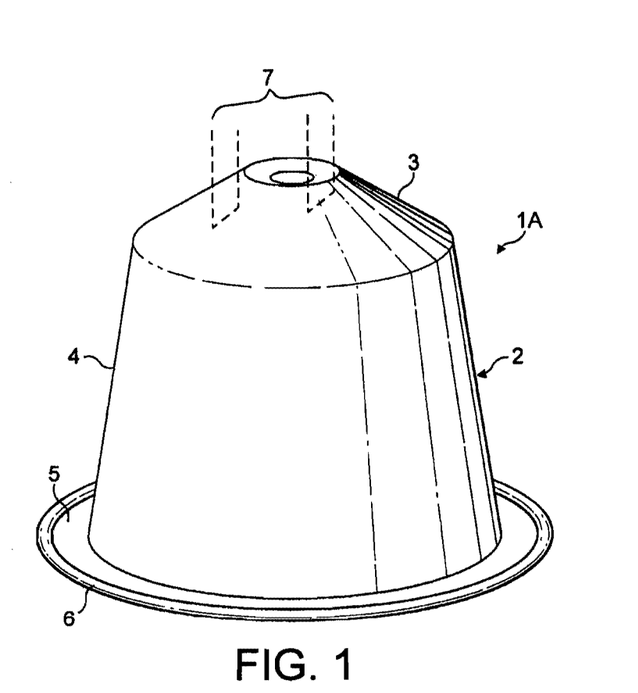
FIG. 1 shows a perspective view of a capsule of the present invention.
Figure 2:
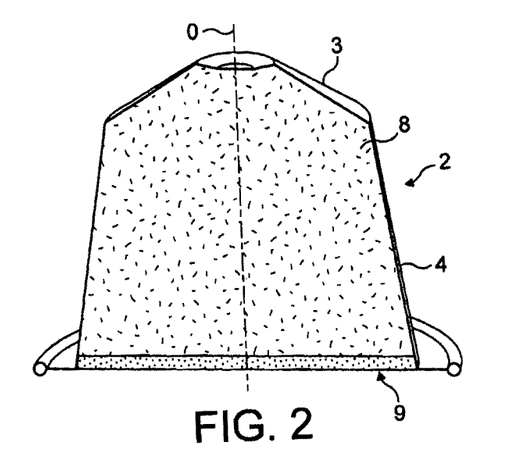
FIG. 2 shows a perspective cross sectional view of a capsule of FIG. 1 according to a first embodiment.
Figure 3:
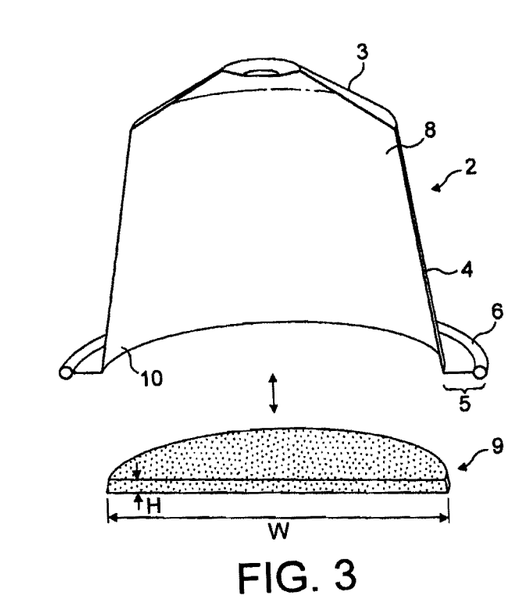
FIG. 3 is a view of the capsule of FIG. 2 with the insert before engaging in the rest of the capsule.

A first embodiment of the capsule 1A of the present invention is illustrated in FIGS. 1 to 3. The capsule 1A comprises a self-supporting cup-shaped body 2 with a bottom wall 3 intended for the injection of water in the capsule, truncated sidewall 4, a rim 5 extending outwardly and terminated by a curled end 6. As aforementioned, the body can be made of aluminum and/or plastic and may be relatively stiff to not collapse when it is perforated by blades of the coffee production machine; which blades provide openings through the capsule for the water injection. The cup-shaped body defines a chamber 8 containing the beverage ingredients, preferably roast and ground coffee. The dose of roast and ground coffee may vary depending on the type of coffee (ristretto, espresso or lungo). Generally, the amount of coffee contained in the chamber is of between 4.5 and 7 grams. The coffee powder is generally a blend of different origins of Arabica and/or Robusta ground coffees.

The chamber of the body is closed by an insert 9 which extends along the entire section of the base of the body. The insert 9 preferably seals on the internal surface 10 of the body. The insert can be press-fitted into the body and further connected by welding or adhesive. For instance, the body has an inner layer of thermofusible material such as polyethylene which is melted by applying heat and pressure on the lower side of the truncated sidewall so that the insert, once in place, is sealed to the body in a permanent fashion. Of course, the edge of the insert may also be provided with a thermofusible material such as PE to be sealed to the inner face of the body.

The body could also be formed with a small step (not shown) which is sized to receive the insert to further improve the integration of the insert in the capsule.

According to the first embodiment of FIGS. 2 and 3, the insert is entirely formed of a three-dimensional open cell structure such as a sintered or foamed material. The insert forms a three-dimensional filtering lattice which is permeable to coffee liquid but impermeable to coffee solid particles of a certain size (e.g., 50 microns and above). The thickness of the insert is such that the flow of coffee is significantly hindered in the axial direction of the insert (Direction of central axis O). This results in the generation of a back-pressure which is higher than the back-pressure of the coffee bed itself. The pressure loss as resulting from the insert itself can be as high as at least 2 bar, preferably at least 3 bar, most preferably at least 5 bars. The optimal pressure loss at the insert is of between 7 and 20 bars depending on the type of coffee to be prepared. For instance, for a lungo coffee (e.g. 8-9 bars), the pressure loss at the insert is set lower than for an espresso (e.g., 10-15 bars) and for a ristretto (e.g., between 15-18 bars) The overall pressure can be measured as the water pressure at the injection point of the capsule and is typically reflecting the sum of the pressure loss in the coffee bed (usually between 0.5 and 1 bar), the pressure loss in the insert and the pressure loss in the capsule holder of the coffee production machine (usually close to atmospheric pressure).

The ratio of the width to thickness of the insert 9 in FIGS. 2 and 3 can be between about 50:1 and 10:1. The thickness of the insert is preferably between 0.5 and 5 mm, most preferably between 0.8 and 2 mm.

The insert 9 may be formed of a ceramic porous element. The insert may also be formed of metallic or plastic three-dimensional open cell structure such as aluminum, PTFE, PE, PA, PE, PU or PP.

The insert 9 may further be protected by an external membrane (not shown) such as a thin polymer or paper membrane. The membrane may further be provided with a gastight layer (e.g., aluminum, EVOH, Alox, $SiO_2$, . . . ) and be removed before inserting the capsule in the coffee preparation machine.

Figure 4:
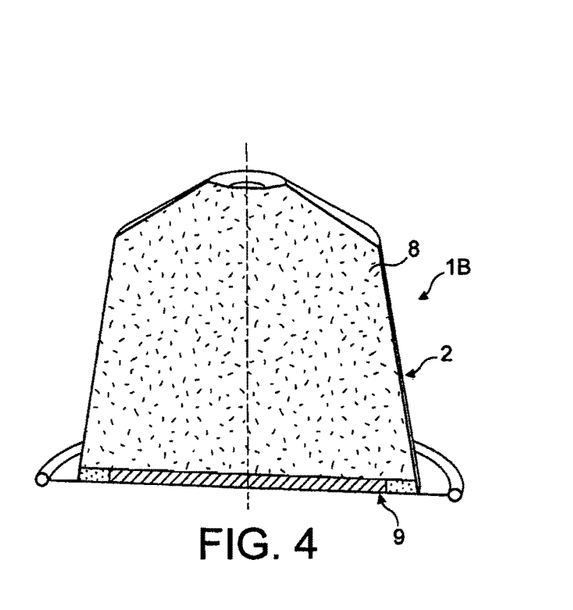
FIG. 4 shows a perspective cross sectional view of a capsule of FIG. 1 according to a second embodiment.
Figure 5:
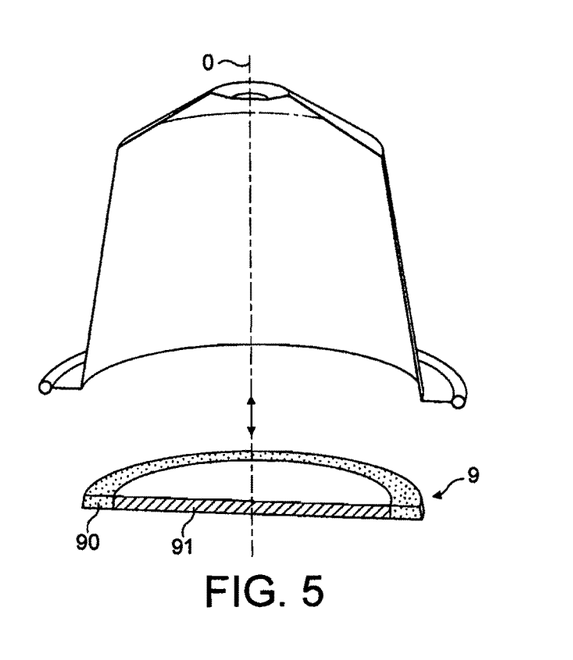
FIG. 5 is a view of the capsule of FIG. 4 with the insert before engaging in the rest of the capsule.

In the embodiment of FIGS. 4 and 5, the capsule 1B of the invention also comprises a cup-shaped body 2 with a chamber 8 closed by a filtering insert 9 comprising a permeable portion 90 and an impermeable portion 91. The two portions 90, 91 are arranged side-by-side in the transversal direction (i.e., direction normal to axis O). In particular, the central portion 91 of the insert is the impermeable portion and the portion 90 forming an annular portion is the permeable one. Portion 90 can, for instance, be made of porous ceramic, metal, plastic and combination thereof. Preferably, the portion 91 is made of a material that is compatible to sealing with the portion 90. For example, both portions 90, 91 can be made of polypropylene or PE. The two portions may have overlapping zones for promoting their connection. The two portions may be connected by mechanical anchoring, overmolding, heat sealing, ultrasonic sealing and combinations thereof. The insert 9 is also connected to the body of the capsule as illustrated by FIG. 5 in the same way as the embodiment of FIGS. 2 and 3.

Figure 6:
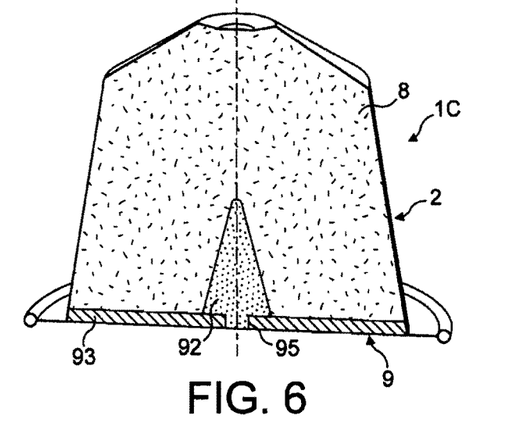
FIG. 6 shows a perspective cross sectional view of a capsule of FIG. 1 according to a third embodiment.
Figure 7:
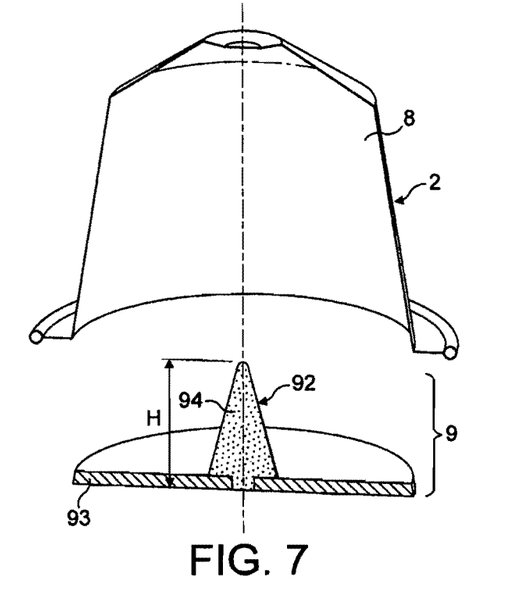
FIG. 7 is a view of the capsule of FIG. 5 with the insert before engaging in the rest of the capsule.
Figure 8:
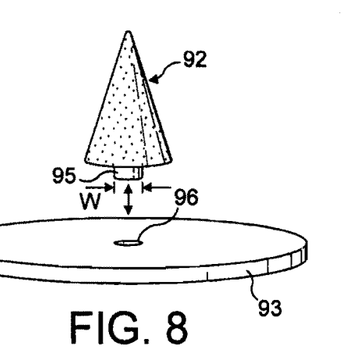
FIG. 8 is a view of the insert of FIG. 7.

In the embodiment of FIGS. 6 to 8, the capsule 1C of the invention also comprises a cup-shaped body 2 delimiting with the insert 9, a chamber 8 for the coffee ingredients. The insert 9 also has a permeable portion 92 and a non-permeable portion 93 connected together by any suitable connection means such as sealing, press-fitting, overmolding and combinations thereof. In this embodiment, the permeable portion 92 is centrally located whereas the non-permeable portion surrounds the permeable portion to constitute the rest of the delivery wall and thus to close the rest of the chamber 8. The portion 92 preferably protrudes inwards the chamber from the plane of the non-permeable portion 93. The portion may comprise a large inlet section 94 and a outlet reduced section 95. The inlet section can form a conical or cylindrical section, for instance. As a result, coffee liquid can pass through the section theoretically at any point of the surface of the section 94 from the upper base of the portion 93. The outlet section 95 is inserted in an opening 96 of the non-permeable portion or disc 93. The diameter of the outlet reduced section may for instance be of 0.5 to 10 mm.

For instance, the permeable portion 92 extends inside the chamber of a depth comprised between 5 and 20 mm. The ratio of the width "w" to the depth "H" of the permeable portion 92 can range of from about 1:30 and 1:5.

The permeable portion 92 can be further made of a porous material taken amongst: ceramic, metal, plastic and a combinations thereof.

Figure 9:
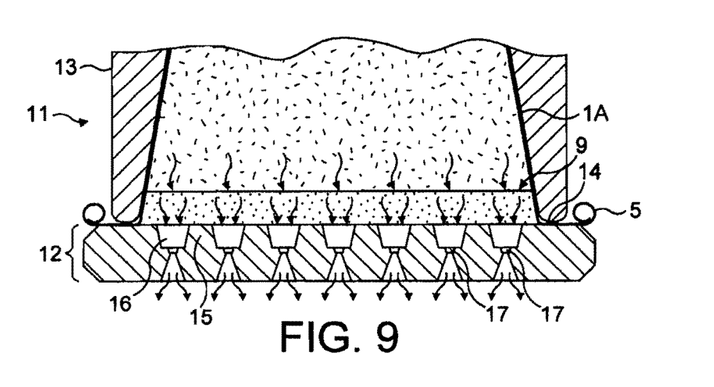
FIG. 9 shows, in cross sectional view, the extraction of coffee from a capsule of FIG. 2 in the coffee production machine.
Figure 10:
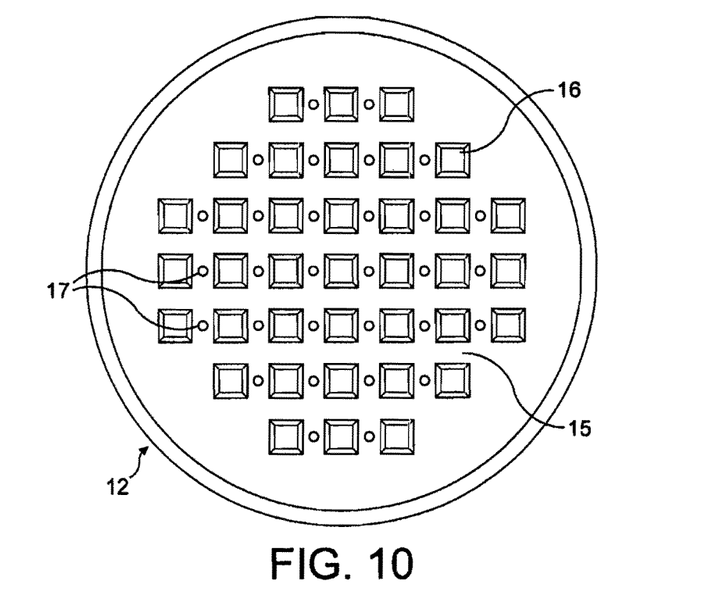
FIG. 10 shows a top view of the support plate of the capsule holder of the coffee production machine.

A capsule 1A according to the first embodiment of FIGS. 1 to 3 is insertable into a coffee production machine 11 illustrated in FIGS. 9 and 10. As generally known per se, such machine 11 comprises a capsule holder 12 onto which the delivery wall of the capsule is pressed and a water injection cage 13 which has a pressing edge 14 which exerts pressure in a liquid-tight closure onto the upper surface of flange-like rim 5 of the capsule. The capsule cage has therefore blades 7 (FIG. 1) which perforate the bottom wall 3 of the cup-shaped body 2 to enable hot water under pressure to enter the chamber of the capsule. Hot water traverses the coffee bed in the chamber to produce the coffee liquid extract at high pressure. Since the insert 9 is of relatively uniform thickness, the coffee liquid will tend to traverse the insert after having overcome everywhere the same pressure drop through the insert. The coffee liquid is then collected in the recessed elements, e.g., channels 16, formed between the relief elements, e.g., pyramids 15, provided in the capsule holder. Since the recessed elements are connected together forming a network of channels, the flow of coffee is able to fill the channels relatively uniformly. The coffee liquid is then evacuated through the small orifices 17 formed in the channels 16 and further collected by a coffee duct (not represented).

Figure 11:
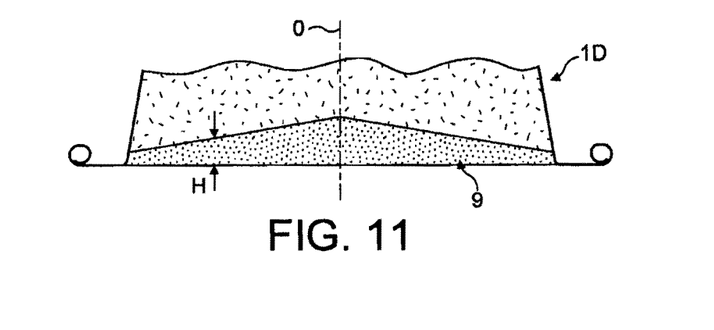
FIG. 11 shows a variant possible of the first embodiment of FIGS. 1 to 3.

The transversal flow pattern through the capsule can be modified by varying the thickness of the insert as shown in FIG. 11. The capsule 1D (shown partially) comprises an insert 9 having a thickness which varies in the transversal direction. As a result, the back pressure of at the filtering insert is also varied thereby influencing the flow of the coffee through the insert as a function of the transversal position considered. In the FIG. 11, the insert has a thickness which increases either gradually, or alternatively stepwise towards the central axis O of the capsule. As a result, a greater pressure loss is created in the centre of the capsule whereas a lower pressure loss is created along the inner surface of the sidewall. Accordingly such design may compensate for the low volume of water typically circulating along the sidewall of the capsule and so provide a more homogeneous flow of liquid through the coffee bed.

Figure 12:
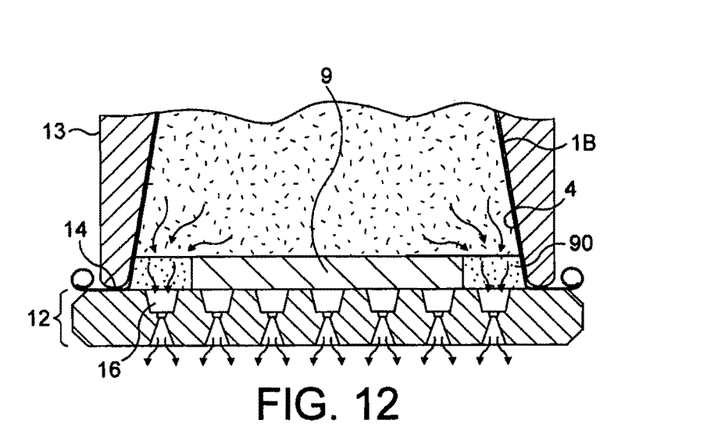
FIG. 12 shows, in cross sectional view, the extraction of coffee from a capsule of FIG. 4 in the coffee production machine.

The extraction of coffee liquid from capsule 1B is illustrated in FIG. 12. In the case of FIG. 1B, the flow of coffee through the delivery wall is promoted along the sidewall 4 of the capsule since only the periphery 90 of the insert is made permeable.

Figure 13:
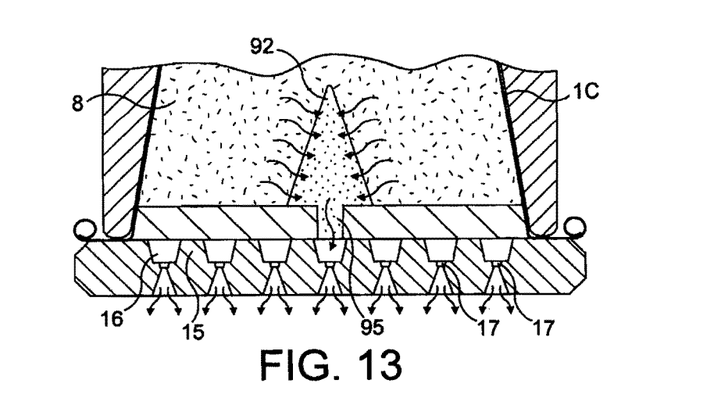
FIG. 13 shows, in cross sectional view, the extraction of coffee from a capsule of FIG. 6 in the coffee production machine.

The extraction of coffee liquid from capsule 1C is illustrated in FIG. 13. In this case, the flow of coffee through the delivery wall is promoted in the centre of the capsule. Also, since the inlet section of the permeable portion extends inside the coffee bed along a certain distance, coffee liquid can enter the porous member before it has traversed the whole thickness of the coffee bed. The non-permeable portion 93 provides rigidity to the delivery wall. Its thickness is such that it deflects only slightly against the relief elements 15 under the pressure of extraction that reigns in the chamber 8. The degree of deflection of plate 93 should be such that it does not block the orifices 17 provided in the collecting channels 16.

Figure 14:
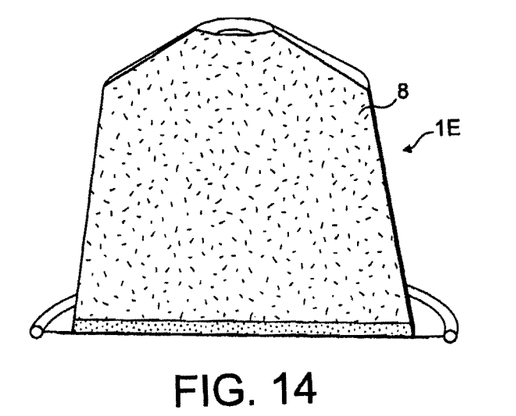
FIG. 14 shows a perspective cross sectional view of a capsule of FIG. 1 according to a fourth embodiment.
Figure 15:
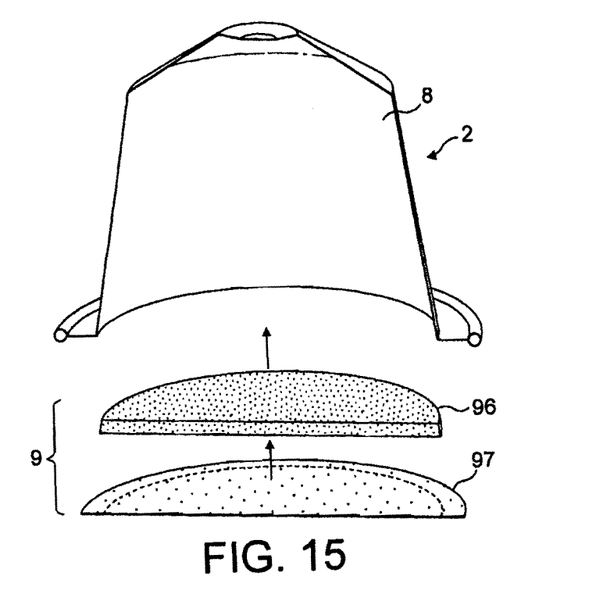
FIG. 15 is a view of the capsule of FIG. 14 with the insert before engaging in the rest of the capsule.

In the embodiment of FIGS. 14 and 15, the capsule 1E has a body 2 with a chamber 8 closed by a coffee delivery insert 8 formed of a layer of compacted coffee 96 and a filter membrane 97. The compacted coffee layer or cake 96 is sufficiently solid and handleable to be inserted through the opening of the chamber. The coffee can be compacted from coffee particles having an average diameter ($D_{4,3}$) comprised between 250 and 1500 microns using a press or rolls under a pressure of about 200 Kg/cm$^2$ to 2 tons/cm$^2$. The filter membrane 97 can be a paper, aluminum membrane, or plastic non woven, a plastic film which is perforated by many small orifices for allowing the coffee to traverse but retain the coffee particles inside. Therefore, the particles of coffee of the compacted layer which break up during extraction are not allowed to traverse the wall 97.

Figure 16:
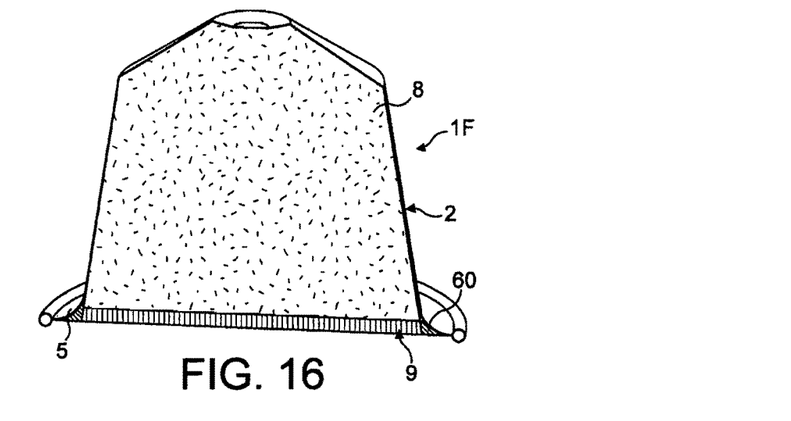
FIG. 16 shows, in perspective cross sectional view, a capsule according to another variant of the invention.
Figure 17:
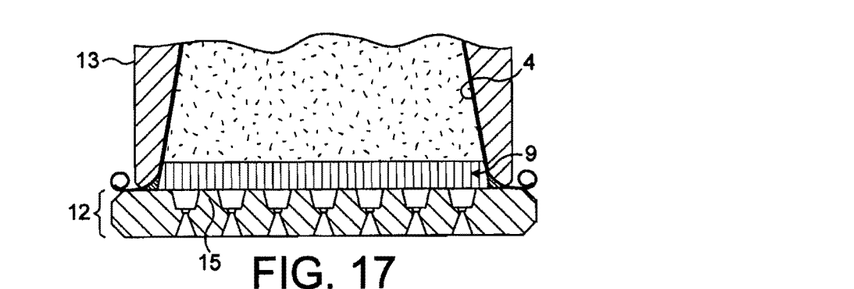
FIG. 17 shows in cross sectional view, the extraction of coffee from a capsule of FIG. 16 in the coffee production machine.
Figure 18:
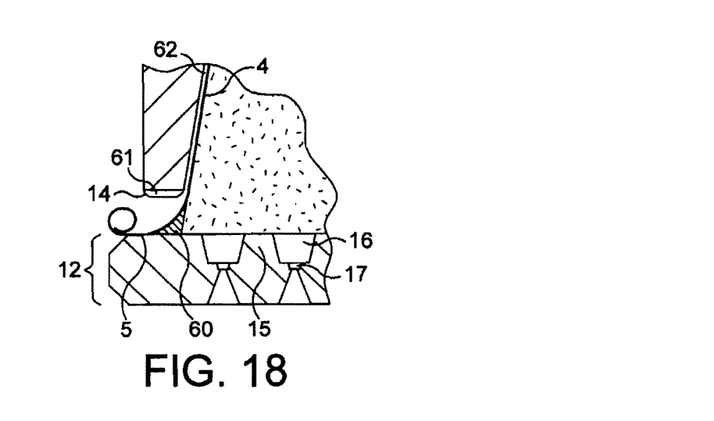
FIG. 18 shows an enlarged view of detail of capsule in the beverage production machine before closure of the machine.

FIGS. 16 to 18 represent a further embodiment of the present invention in which the capsule 1F comprises a body 2 closed by a porous insert 9 as described in any of the previous embodiments. The capsule further comprises a sealing means 60 positioned at the intersection between the flange-like rim 5 and the sidewall 4 of the capsule. The sealing means 60 is designed to provide liquid tightness between the injection cage 13 of the machine and the surface of the capsule at the flange-like rim as illustrated in FIG. 17. The pressing surface of the injection cage preferably comprises a plurality of radial slots or grooves 61 which form air inlets when the compressive force of injection cage on the capsule and capsule holder is removed. The slots or grooves thus promote the introduction of air along the small gap 62 formed between the capsule and the inner surface of the cage. As a result, the slight vacuum obtained by the effect of injection is broken and the capsule can be more easily removed from the injection cage.

The sealing means is such that the pressing surface of the injection cage forces the sealing means 60 in compression. The liquid tightness obtained by the conjunction of the sealing means on the capsule and the injection cage should enable the building of pressure in the capsule, especially just upstream the porous delivery wall (i.e., insert 9). The sealing means should be configured so that a pressure of at least 5 bar, preferably at least 6 bar, most preferably at least 8 bar, is created, when measured at the injection side of the cage.

The sealing means 60 can be formed integrally in the wall of the body 2. For example, the sealing means is formed together with the body of the capsule by an operation of thermoforming or injection-molding. Alternatively, the sealing means 60 is formed of a sealing means added onto the surface of the body. The sealing means may for instance be a soft ring of plastic or rubber (e.g., silicone rubber).

To provide a more effective sealing, the sealing means 60 is preferably arranged as a triangular thickness increase of material at the intersection between the sidewall 4 and the flange-like rim 5 of the capsule. Thus it forms a sort of wedge by the pressure exerted by the injection cage on the capsule. The outer surface of the sealing means 60 is preferably flat or slightly concave as illustrated.

The capsules of the invention can be further packed in a packaging containing an inert gas, such as a flow wrap package, or each capsule be individually wrapped with a film which is barrier to oxygen.

What is claimed is:

1. A capsule for the production of a beverage from a beverage production machine that provides a capsule holder with relief and recessed elements, with the capsule comprising:
    an inverted body having a central axis and width, a bottom injection wall, a sidewall and a flange-like rim that surrounds an opening, with the body forming a chamber containing a beverage forming ingredient therein; and
    a delivery wall which is sealed to the body to close the opening, and which comprises a flat outer surface extending from the central axis of the capsule to the flange-like rim of the body and an insert having a three-dimensional portion of porous material, with the portion of porous material of the insert having a ratio of transversal width to depth from 30:1 to 1:30, in order to provide to the delivery wall a backpressure that is greater than the backpressure of the beverage forming ingredient in the chamber;
    wherein the portion of porous material has either (a) an open cell structure of aggregated solid particles which holds a number of pores in axial and transversal directions, or (b) a three-dimensional filtering structure configured by a filtering lattice in axial and transversal dimensions with the structure comprising a plurality of layers of plastic non woven and metal lattice elements, or (c) both (a) and (b).

2. The capsule of claim 1, wherein the portion of porous material provides a back-pressure of at least 3 bars.

3. The capsule of claim 1, wherein the portion of porous material extends across the width of the chamber and has a thickness that varies in a transversal direction of the capsule.

4. The capsule of claim 3, wherein the insert further comprises at least one portion of impermeable material.

5. The capsule of claim 4, wherein the portion of porous material is placed at the periphery of the portion of impermeable material when taken in the transversal direction of the insert and the portion of porous material is placed in the center of the insert.

6. The capsule of claim 5, wherein the portion of porous material protrudes inwardly into the chamber from the portion of impermeable material.

7. The capsule of claim 1, wherein the portion of porous material is formed of an open cell structure of aggregated solid particles formed from ceramic, metal, carbon, or polymers selected from the group consisting of [PTFE] polytetrafluoroethylene, polyamide, polypropylene, polyethylene, polyurethane and combinations thereof.

8. The capsule of claim 1, wherein the portion of porous material is formed of a biodegradable material selected from polylactic acid, biobase polypropylene, ricin-oil based polyamide, starch-based polymers, [PVOH] polyvinyl alcohol, or combinations thereof.

9. The capsule of claim 1, wherein the delivery wall and body of the capsule are formed of the same material and the portion of porous material is formed from at least one of fabric and nonwoven material selected from the group consisting of fluoropolymer, polyurethane, polyester, polyamide and combinations thereof.

10. The capsule of claim 1, wherein the delivery wall comprises a gas impermeable breakable or peelable membrane for closing the portion of porous material and the flange-like rim is compressible in the machine to provide liquid tightness with a pressing surface of the machine under pressure of extraction liquid.

11. The capsule of claim 1, wherein the flange-like rim is a thin plastic curled lip or an annular step of the body and is foldable in the machine to provide liquid tightness with a pressing surface of the machine under the pressure of the extraction liquid.

12. The capsule of claim 1, wherein the flange-like rim or outer surface of the body includes a sealing member which forms a local increase of thickness between the rim and the sidewall.

13. The capsule of claim 12, wherein the sealing member is made of compressible plastic or rubber having a hardness below 60 shore A.

14. The capsule of claim 1, wherein the portion of porous material comprises a compacted layer of coffee having an average particle size ($D_{4,3}$) comprised between 250 and 600 microns and which further comprises a filtering wall placed downstream of the compacted layer of coffee.

15. The capsule of claim 1, wherein the delivery wall is at least partially detachable and re-closable from the flange-like rim, and the delivery wall forms an insert which is press-fit into the body.

16. An apparatus for the preparation of a beverage comprising:
a beverage production machine comprising a capsule holder with relief and recessed elements and a water injection cage with a pressing edge, and
the capsule of claim 1;
wherein injection of water into the capsule forms the beverage.

17. The apparatus of claim 16, wherein the pressing edge of the injection cage is formed of radially oriented slots which are filled by sealing means of the capsule to provide a sufficient tightness enabling the pressure to rise in the capsule as a result of the backpressure created by the bed of ingredients and porous portion.

18. The apparatus of claim 17, wherein the slots have a depth between 0.2 and 0.8 mm and the pressure rises at least 5 to 8 bars at the injection outlet of the injection cage.

19. A method of forming a beverage which comprises:
providing a capsule according to claim 1;
injecting water into the capsule for combining with the beverage forming ingredients therein to form the beverage; and withdrawing the beverage from the capsule for consumption.

* * * * *